United States Patent [19]

Seyffer et al.

[11] Patent Number: 5,536,766

[45] Date of Patent: Jul. 16, 1996

[54] FORMALDEHYDE-FREE BINDING, IMPREGNATING OR COATING COMPOSITIONS FOR FIBROUS SHEET MATERIALS

[75] Inventors: Hermann Seyffer, Heidelberg; Robert Rupaner, Kronberg; Erhard Günther, Hassloch; Rainer Hummerich, Worms, all of Germany

[73] Assignee: BASF Aktiengesellschaft, Ludwigshafen, Germany

[21] Appl. No.: 404,578

[22] Filed: Mar. 15, 1995

[30] Foreign Application Priority Data

Mar. 15, 1994 [DE] Germany .................. 44 08 688.1

[51] Int. Cl.⁶ .................................. C08K 5/34
[52] U.S. Cl. .................. 524/100; 524/101; 524/102; 524/103; 524/186; 524/383; 524/384; 524/385; 524/386
[58] Field of Search ................. 524/100, 101, 524/102, 103, 186, 383, 384, 385, 386, 387

[56] References Cited

U.S. PATENT DOCUMENTS

| 4,387,212 | 6/1983 | Hummerich et al. .................. 528/232 |
| 5,137,963 | 8/1992 | Stack ....................... 524/519 |

FOREIGN PATENT DOCUMENTS

| 2037214 | 9/1991 | Canada . |
| 0445578 | 9/1991 | European Pat. Off. . |
| 0512732 | 11/1992 | European Pat. Off. . |
| 0583086 | 2/1994 | European Pat. Off. . |
| WO92/09660 | 6/1992 | WIPO . |

OTHER PUBLICATIONS

Patent Abstracts of Japan, vol. 9, No. 153 (c–288), Jun. 27, 1985, JP-A-60 031 528, Feb. 18, 1985.

*Primary Examiner*—Jeffrey T. Smith
*Attorney, Agent, or Firm*—Oblon, Spivak, McClelland, Maier & Neustadt

[57] ABSTRACT

A formaldehyde-free binding, impregnating or coating composition comprises

A) a polymer constituted to from 2 to 100% by weight of an ethylenically unsaturated acid or anhydride as comonomer, and B) at least one polyol selected from a triazine of the formula

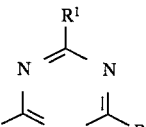

where $R^1$ to $R^3$ are each independently of the others a radical $X[(C_mH_{2m}O)_nH]$ or $N[(C_mH_{2m}O)_nH]_2$ where X is NH, O or S, m is from 2 to 5 and n is from 1 to 10, a triazinetrione of the formula

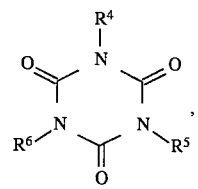

where $R^4$ to $R^6$ are each independently of the others a radical $[(C_mH_{2m}O)_nH]$ where m is from 2 to 5 and n is from 1 to 10, a benzene or cyclohexyl derivative of the formula

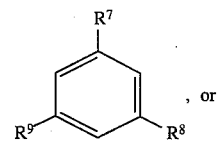

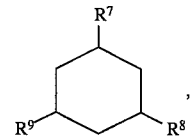

where $R^7$ to $R^9$ are each independently of the others a radical $[X(C_mH_{2m}O)_nH]$, a radical $N[C_mH_{2m}O)_nH]_2$, a radical $[Y(C_mH_{2m}O)_nH]$ or a radical $[(C_mH_{2m}O)_nH]$ where X is NH, O or S, Y is bivalent $C_1$–$C_6$-alkyl or acyl, m is from 2 to 5 and n is from 1 to 10, and a compound of the formula

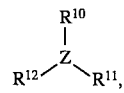

where $R^{10}$ to $R^{12}$ are each independently of the others a linear or branched, aliphatic or aromatic radical which has a total of from 1 to 12 carbon atoms and which may also contain ether groups and carries at least one hydroxyl group, and Z is N, $PO_3$, $BO_3$, $PO_4$ or C—$R^{13}$, where $R^{13}$ is a linear or branched, substituted or unsubstituted alkyl or aryl radical having up to 10 carbon atoms.

9 Claims, No Drawings

FORMALDEHYDE-FREE BINDING, IMPREGNATING OR COATING COMPOSITIONS FOR FIBROUS SHEET MATERIALS

The present invention relates to formaldehyde-free binding, impregnating or coating compositions comprising A) a polymer constituted to from 2 to 100% by weight of an ethylenically unsaturated acid or anhydride as comonomer, and B) at least one polyol selected from
a triazine of the formula

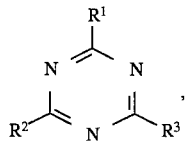   I where $R^1$ to $R^3$ are each independently of the others a radical $X[(C_mH_{2m}O)_nH]$ or $N[(C_mH_{2m}O)_nH]_2$ where X is NH, O or S, m is from 2 to 5 and n is from 1 to 10,
a triazinetrione of the formula

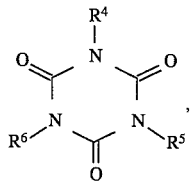   II where $R^4$ to $R^6$ are each independently of the others a radical $[(C_mH_{2m}O)_n/H]$ where m is from 2 to 5 and n is from 1 to 10, and a benzene or cyclohexyl derivative of the formula

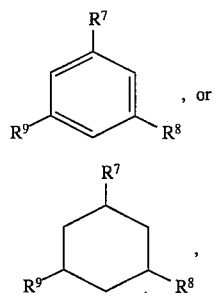   III

, or

IV where $R^7$ to $R^9$ are each independently of the others a radical $[X(C_mH_{2m}O)_nH]$, a radical $N[C_mH_{2m}O)_nH]_2$, a radical $[Y(C_mH_{2m}O)_nH]$ or a radical $[(C_mH_{2m}O)_nH]$ where X is NH, O or S, Y is bivalent $C_1$–$C_6$-alkyl or acyl, m is from 2 to 5 and n is from 1 to 10.

The present invention further relates to the use of the formaldehyde-free binding, impregnating or coating compositions for producing fibrous sheet materials.

Bonded sheetlike fiber structures are frequently produced using binding or bonding compositions (binders) which include formaldehyde-eliminating crosslinkers. To avoid formaldehyde emissions, it is desirable to have alternatives to existing binders.

WO 92/09660 and U.S. Pat. No. 5,137,963 disclose formaldehyde-free mixtures of polymers for use as binders for textile fiber webs. However, the production of a plurality of polymers for a binder is very costly.

EP-A-512 732 and EP-A-583 086 describe glass fiber binders which include carboxyl-containing polymers and β-hydroxyalkylamides as crosslinkers.

EP-A-445 578 relates to shaped articles comprising a filler, including for example fibers, and a binder. The binder comprises a polycarboxylic acid and a polyhydric alcohol, for example glycerol, alkanolamine or a polyamine.

In addition to existing formaldehyde-free binders, it is always desirable to have further formaldehyde-free binders available as alternatives. More particularly, suitable binders for fibrous sheet materials should display good heat distortion resistance and wet strength after curing. It is also advantageous for the binders to be flame-retardant, reducing the need for added flameproofing agents.

It is an object of the present invention to provide such binders.

We have found that this object is achieved by the above-described binders and their use for producing fibrous sheet materials.

Polymer A) includes from 2 to 100% by weight, based on the polymer, preferably from 30 to 100% by weight, particularly preferably from 50 to 100% by weight, very particularly preferably from 70 to 100% by weight, of an ethylenically unsaturated anhydride or preferably of an ethylenically unsaturated acid (hereinafter called collectively acidic comonomer).

Suitable acidic comonomers preferably have a water solubility of at least 2 g of acidic comonomer/100 g of water at 20° C., particularly preferably of at least 5 g, and very particularly preferably of at least 10 g/100 g of water. The ethylenically unsaturated acid can be in a completely or preferably partially neutralized or unneutralized form.

Suitable acidic comonomers include monocarboxylic acids, such as (meth)acrylic acid, crotonic acid, dicarboxylic acids, such as maleic acid, fumaric acid and itaconic acid, sulfonic acids or phosphonic acids, such as vinylsulfonic acid, styrylsulfonic acid, vinylphosphonic acid, and also their homologous alkylated derivatives, anhydrides of said acids or partial esters of the polybasic acids with at least one remaining acid group.

Preference is given to carboxylic acids, especially monocarboxylic acids, such as (meth)acrylic acid.

The acids can be completely or preferably partially neutralized or unneutralized. The (partial) neutralization can be effected before, during or after the preparation of polymer A). Suitable neutralizing agents include basic compounds such as aqueous solutions of ammonia or amines and also aqueous solutions of metal hydroxides, carbonates, oxides or else acetates and formates. Preferred neutralizing agents include aqueous solutions or suspensions of ammonia, amines, sodium hydroxide, calcium hydroxide, magnesium oxide or zinc oxide. However, very particular preference is given to ammonia or volatile amines, which have the advantage of leaving behind a less water-sensitive polymer film. The neutralization is preferably carried on only to a certain degree so that some of the carboxyl groups are present in the form of the acid. Preference is given to setting a pH of below 7, in particular 6.5.

Further comonomers which may be present in polymer A) include for example acrylamide or methacrylamide, which can be used for example to regulate viscosity, aromatic vinyl compounds having up to 10 carbon atoms, such as styrene or methylstyrene, (meth)acrylic esters, especially $C_1$–$C_{12}$-alkyl (meth)acrylates or else $C_1$–$C_{12}$-hydroxyalkyl (meth)acrylates, (meth)acrylonitrile, vinyl esters of carboxylic acids of from 1 to 20 carbon atoms, vinyl halides or further comonomers which may also contain for example epoxy, hydroxyl, isocyanate or carbonyl groups. Polymer A) may also contain crosslinking bi- or polyfunctional monomers, for example bis- or poly(meth)acrylates or bisolefins such as butanediol diacrylate, trimethylolpropane triacrylate, divinylbenzene, triallyl cyanurate, allyl methacrylate, bis- or polyacryloylsiloxanes (Tegomers® from TH. Goldschmidt AG).

Polymer A) is preferably water-soluble at 20° C. or has a water solubility of at least 10 g per 100 g of water.

Polymer A) can be prepared for example in bulk, in solution (for example in water) or by emulsion polymerization in water. Its preparation batch may also include for example polymerization regulators for controlling the molecular weight.

The weight average molecular weight $M_w$ of polymer A) is preferably from $10^3$ to $10^7$, particularly preferably from $10^4$ to $10^6$. High molecular weight polymers with $M_w > 10^5$ and low viscosity are obtainable in particular by emulsion polymerization.

The binders of the present invention are preferably obtained by adding polyols B) to an aqueous solution or dispersion of polymer A). The amount of polyol is preferably chosen so that the acid or anhydride groups, which may also be present in neutralized form, are present in excess compared with the hydroxyl groups of the polyol.

The molar ratio of the acid or anhydride groups to the hydroxyl groups of polyol B) preferably ranges from 1000:1 to 1:1, particularly preferably from 400:1 to 5:1.

The polyols are the above-described compounds of the formulae I to IV or mixtures thereof.

Preferred triazines of the formula I are those where $R^1$ to $R^3 = [NH—(C_mH_{2m}O)_nH]$. Compounds where n>1 are obtainable through alkoxylation of the corresponding hydroxyalkylmelamines.

Particular preference is given to N,N',N''-tris(hydroxyalkyl)melamines, for example N,N',N''-tris(hydroxyethyl)melamine. The preparation of compounds of the formula I is known to those skilled in the art and described for example in EP-A-225 433.

Preferred triazinetriones of the formula II are N,N',N''-tris(hydroxyalkyl) isocyanurates (n=1), for example N,N',N''-tris(hydroxyethyl) isocyanurate (THEIC). Derivatives where n>1 are obtainable by alkoxylation.

In preferred benzene or cyclohexyl derivatives of the formulae III and IV, $R^7$ to $R^9$ are each $[X(C_mH_{2m}O)_n]$ where X is preferably 0. Compounds where n>1 are obtainable as above by alkoxylation.

In the case of cyclohexyl derivatives, the preferred configuration of the R radicals is all cis. The cyclohexyl derivatives are readily obtainable through catalytic hydrogenation of the corresponding aromatic compounds. A specific example is tris(hydroxyethyloxy)benzene.

Preferably, the radicals $R^1$ to $R^3$, $R^4$ to $R^6$ and $R^7$ to $R^9$ in the formulae I to IV are in each case identical. The compounds of the formulae I to V preferably have a C3 or D3 symmetry (possible symmetry operations C3: threefold axis of rotation; D3: threefold axis of rotation plus three twofold axes of rotation perpendicular thereto (see Moore Hummel, Physikalische Chemie, 3rd edition Berlin 1983, p. 872 ff.). The compounds may additionally allow further symmetry operations.

Dispersions or solutions containing both polymers A) and compounds B) can be used as binding, impregnating or coating compositions. The dispersions or solutions may additionally include for example pigments, fillers, flameproofing agents, dispersants, thickeners, crosslinkers, plasticizers, dyes, wetting agents, water repellents, brighteners, film formation assistants, preservatives or defoamers.

They may additionally also include catalysts for a crosslinking reaction of A) with B), for example acids such as sulfuric acid or p-toluenesulfonic acid.

The solutions or dispersions are particularly suitable for use as binders for producing fibrous sheet materials, also known as nonwovens. The solution or dispersion is applied to an unbonded fiber web, preferably in a ratio of fiber/binder (solids) of from 6:1 to 3:1 parts by weight.

The weight of the unbonded fiber web can be for example between 20 to 500 g per m$^2$.

The binder is preferably applied to the fibers in the form of a dilute aqueous liquor (ie. from about 20 to 40% strength by weight) or in the form of an impregnation in a horizontal padder, in which case the concentration of the binder in the aqueous liquor is preferably from 5 to 25% by weight. If desired, an excess of binder can subsequently be squeezed or sucked off before the consolidation is effected by drying and the nonwoven becomes bonded. The drying is preferably carried out at temperatures between 100° and 400° C., in particular 130° and 280° C., over a period of preferably from 2 to 10 min. In the course of the drying, the binder crosslinks and confers the requisite strength on the now binder-bonded nonwoven. The binders of the present invention give remarkably good heat resistances in a complete absence of formaldehyde. Heat resistance is here the mechanical resistance of the fiber-polymer composite to an applied tensile stress (including for example at high temperatures such as 180° C.). At the same time, very good strengths are also achieved for the wet nonwoven (wet strengths), which substantially prevents tearing of the nonwoven web due to tensile stresses during coating or drying in the course of transportation by belts or rolls.

After drying, there is virtually no sign of yellowing and boiling up the nonwoven with water leads to virtually no weight losses.

The thickness of the bonded nonwoven is preferably between 0.5 and 3 mm.

The binder of the present invention also confers on the nonwoven a certain degree of flameproofing, reducing any needed addition of flameproofing agents.

The binder of the present invention is suitable particularly for producing nonwovens based on aramid, carbon, mineral, polyacrylonitrile or polyester fibers, particularly preferably glass fibers.

Nonwovens based on the aforementioned fibers are also suitable in particular for use as inliners in bituminized roofing felts, in floor coverings and as filter material or else as battery separators.

EXAMPLES

| Abbreviations | |
|---|---|
| THOM | N,N',N''-tris(5-hydroxy-3-oxapentyl)melamine |
| THEM | N,N',N''-tris(2-hydroxyethyl)melamine |
| TAHM | N,N',N''-tris(6-aminohexyl)melamine |
| HOM 154 | mixture of mono-, bis- and tris-N-(hydroxyethyl)melamine in a ratio of 1:5:4 |
| THEIC | N,N',N''-tris(hydroxyethyl) isocyanurate |
| HHEM | N,N,N',N',N'',N''-hexakis(hydroxyethyl)melamine |

Test methods:

a) Gel permeation chromatography (GPC)

The molar mass is determined by gel permeation chromatography (=GPC) using aqueous eluents. The separating columns were calibrated with narrowly distributed polystyrene sulfonates from Pressure Chem. Comp. and conversion to the molar mass units of sodium polyacrylate was carried out by the universal calibrating principle of Benoit (J. Chim. Phys. 63 [1966], 1507) using measuring data of Spatorico and Beyer (J. Appl. Polym. Sci. 19 [1975], 2933).

b) K value

The K value is a parameter for characterizing the degree of polymerization and was measured by the method of Fikentscher, Cellulose Chemie 13 (1932), 58, on a 1% strength aqueous solution at pH 7.

EXAMPLE 1

Effect of drying temperature

Binder: To 100 parts of a 25% strength by weight aqueous solution of a polymethacrylic acid having an average molecular weight of $M_w=20,000$ and a K value of 50 were added with stirring 1.3 parts (corresponds to 5% by weight based on the polymethacrylic acid) of THOM in the form of a 95% strength solution at 25° C. The batch was subsequently stirred for 15 min until homogeneous. The resulting solution had a pH of 2.2.

Impregnation, drying and tensile tests: The binder solution was diluted with water to a total solids content of 15% by weight and introduced into the impregnating trough. The web used was a glass fiber web of size 26.5×32.5 cm which had been lightly prebonded with melamine-formaldehyde resins (about 7% of binder add-on, basis weight about 50 g/m$^2$). After 2×20 sec dips into the impregnating liquor, the excess binder was sucked off to achieve a binder content of 20% (based on the total weight) and the impregnated glass web was dried in a Mathis oven for 6 min at the stated temperature. The glass fiber sheet was cut into strips 50 mm wide which were stretched in a tensile tester at 50 mm/min to the point of rupture. To measure the wet strength, corresponding test strips were placed in water at 80° C. for 15 min and then tested in the moist state at the stated temperature (breaking strength, BS). The results of the measurements (averages of 5 specimens) are reported in newtons (N) and are based on the test strip width of 50 mm. To determine the boil-off loss (BOL) the gravimetric decrease in the web weight after 15 min of boiling up in distilled water was determined.

| Drying temperature in °C. | BS, dry at 25° C. | BS, wet at 25° C. | BS, wet at 80° C. | BS at 180° C. | BOL in % |
|---|---|---|---|---|---|
| 200 | 196 | 180 | 34 | 119 | 3.7 |
| 210 | 225 | 183 | 58 | 140 | 2.8 |
| 220 | 224 | 185 | 98 | 168 | 2.4 |
| 230 | 206 | 181 | 98 | 184 | 2.6 |
| 240 | 195 | 165 | 132 | 158 | 2.8 |

EXAMPLE 2

Example 1 was repeated with the difference that the polymethacrylic acid solution was admixed with 15% by weight of HOM 154.

| Drying temperature in °C. | BS, dry at 25° C. | BS, wet at 25° C. | BS, wet at 80° C. | BS at 180° C. | BOL in % |
|---|---|---|---|---|---|
| 180 | 217 | 113 | 35 | 202 | 4.7 |
| 190 | 260 | 179 | 43 | 178 | 2.8 |
| 200 | 261 | 194 | 63 | 171 | 1.6 |
| 210 | 263 | 224 | 109 | 182 | 1.6 |
| 220 | 243 | 211 | 148 | 204 | 1.0 |
| 230 | 246 | 206 | 170 | 182 | 1.0 |

EXAMPLE 3

Effect of drying time

Example 1 was repeated except that the impregnated glass webs were dried for different periods at 230° C.

| Drying time in min | BS, dry at 25° C. | BS, wet at 25° C. | BS, wet at 80° C. | BS at 180° C. | BOL in % |
|---|---|---|---|---|---|
| 2 | 205 | 201 | 47 | 117 | 2.6 |
| 4 | 215 | 190 | 72 | 149 | 2.5 |
| 6 | 200 | 178 | 109 | 145 | 2.3 |
| 8 | 189 | 176 | 107 | 161 | 2.4 |
| 10 | 210 | 168 | 116 | 177 | 2.4 |
| 12 | 207 | 174 | 125 | 172 | 2.5 |
| 10* | 232 | 193 | 146 | 193 | 1.8 |

*contained twice the amount of THOM

EXAMPLE 4

Use of various melamine derivatives and comparative substances

A 25% strength by weight aqueous solution of a polymethacrylic acid of Example 1 was admixed dropwise at 25° C. with a 25% strength by weight aqueous solution or suspension of the polyhydroxy component and subsequently stirred for 15 min by adding in each case 5% by weight of crosslinker, based on the total amount of polymethacrylic acid. This solution was diluted to 20% by weight and used for impregnating glass webs without further additions.

Drying conditions: 6 min at 230° C.

| Crosslinking substance | BS, dry at 25° C. | BS, wet at 25° C. | BS, wet at 80° C. | BS at 180° C. | BOL in % |
|---|---|---|---|---|---|
| THOM | 213 | 174 | 96 | 140 | 3 |
| THEM | 204 | 178 | 141 | 165 | 3 |
| THEIC* | 267 | 185 | 78 | 170 | 1.5 |
| HOM 154 | 195 | 180 | 82 | 127 | 2.5 |
| HHEM | 234 | 213 | 177 | 205 | 1.0 |
| C1 | precipitates | — | — | — | — |
| C2 | 188 | 127 | 40 | 98 | 3.2 |
| C3 | precipitates | — | — | — | — |
| C4 | 192 | 185 | 77 | 132 | 1.8 |
| C5 | 164 | 114 | 60 | 131 | 11.5 |
| C6 | 180 | 163 | 56 | 129 | 4.4 |
| C7 | 209 | 152 | 61 | 188 | 5.6 |
| C8 | precipitates | — | — | — | — |

C1: Ethoxylated ethylenediamine, EO degree about 12
C2: Polyethylene glycol, MW about 200
C3: Polyhydroxyethyl acrylate
C4: Bis[N,N-di(β-hydroxyethyl)]adipamide, EP 512 732, Ex. 1
C5: High viscosity polyvinyl alcohol
C6: Glycerol
C7: Commercial urea-formaldehyde resin (2–3% by weight of free formaldehyde)
CB: TAHM
*Amount used 10% by weight (based on polymethacrylic acid)
**Amount used 16% by weight (based on polymethacrylic acid)

The tests show that amine-containing crosslinking agents have a flocculating effect, that predominantly linear polyols have distinct weaknesses in the 180° C. strength, and that polyols such as glycerol or polyvinyl alcohol lead to a strong boil-off loss.

EXAMPLE 5

Various polycarboxylic acids

Example 1 was repeated with aqueous solutions of polyacrylic acids of different molecular weights, containing in each case 5% by weight (based on solids of polyacrylic acid), blended with a 25% strength aqueous solution of HOM 154.

| Polyacrylic acid | BS, dry at 25° C. | BS, wet at 25° C. | BS, wet at 80° C. | BS at 180° C. | BOL in % |
|---|---|---|---|---|---|
| 1 | 152 | 108 | 49 | 87 | 9.6 |
| 2 | 158 | 131 | 74 | 142 | 4.5 |
| 3 | 199 | 178 | 70 | 136 | 2.0 |
| 4 | 221 | 45 | 9 | 161 | 5.5 |
| 5 | 202 | 112 | 57 | 159 | 5.7 |

1 50% strength solution of a polyacrylic acid, $M_w = 4000$, K value = 20
2 50% strength solution of a maleic acid-acrylic acid copolymer, $M_w = 3000$, K value = 20
3 25% strength solution of a polyacrylic acid, $M_w = 20,000$, K value = 50
4 Sodium salt of a maleic acid/acrylic acid copolymer, $M_w = 70,000$, K value = 60
5 as 4, but liquor adjusted to pH = 1 with concentrated hydrochloric acid.

EXAMPLE 6

Different proportion of HOM 154

Example 1 is repeated except that the proportion of crosslinker was increased stepwise. Drying conditions: 6 min at 230° C.

| Proportion of HOM 154 in % | BS, dry at 25° C. | BS, wet at 25° C. | BS, wet at 80° C. | BS at 180° C. | BOL in % |
|---|---|---|---|---|---|
| 0* | | | | | |
| 5 | 201 | 161 | 69 | 113 | 1.9 |
| 10 | 226 | 203 | 137 | 171 | 0.8 |
| 15 | 242 | 201 | 158 | 147 | 0.5 |
| 20 | 235 | 211 | 160 | 163 | 0.4 |
| 25 | 226 | 213 | 155 | 158 | 0.3 |
| 30 | 242 | 200 | 167 | 168 | 0.1 |
| 35 | 239 | 206 | 171 | 168 | 0.3 |
| 40 | no longer miscible | | | | |
| 25** | 234 | 183 | 156 | 153 | 0.9 |

*Comparative test
**Polyacrylic acid with lower molecular weight, $M_w = 4000$

EXAMPLE 7

Acid catalysis

Example 2 is repeated in a mixing ratio of 100:10 parts by weight of polyacrylic acid:HOM 154. The catalyst is added to the homogeneous, aqueous mixture at 25° C. a little at a time, and stirring is continued until the batch is homogeneous. Drying conditions: 6 min 200° C.

| Catalyst | pH | BS, dry at 25° C. | BS, wet at 25° C. | BS, wet at 80° C. | BS at 180° C. | BOL in % |
|---|---|---|---|---|---|---|
| none* | 2.8 | 219 | 195 | 161 | 195 | 1.0 |
| none | 2.8 | 260 | 181 | 48 | 163 | 4.1 |
| 1% of p-TS** | 2.6 | 248 | 173 | 46 | 159 | 3.9 |
| 2% of p-TS | 2.5 | 241 | 183 | 55 | 118 | 3.7 |
| 1% of $NH_4Cl$ | 2.7 | 166 | 88 | 34 | 86 | 18.8 |
| 2% of $NH_4Cl$ | 2.7 | 243 | 184 | 55 | 120 | 3.5 |
| 1% of $H_2SO_4$ | 2.2 | 228 | 176 | 47 | 143 | 3.3 |
| 4% of $H_2SO_4$ | 1.3 | 193 | 130 | 48 | 122 | 5.1 |
| 10% of $H_2SO_4$ | 1.0 | 171 | 123 | 35 | 89 | 6.8 |

*Mixing ratio 100:5
**p-Toluenesulfonic acid

EXAMPLE 8

Effect of pH

Example 7 is repeated except that the homogeneous, aqueous mixture is adjusted a little at a time with aqueous ammonia to the corresponding pH at 25° C. and then diluted to a liquor concentration of 15%. Drying conditions: 6 min 220° C.

| pH of liquor | BS, dry at 25° C. | BS, wet at 25° C. | BS, wet at 80° C. | BS at 180° C. | BOL in % |
|---|---|---|---|---|---|
| 2.8 | 259 | 221 | 111 | 203 | 1.1 |
| 4.3 | 258 | 226 | 149 | 190 | 1.7 |
| 6.2 | 225 | 175 | 134 | 154 | 2.2 |

EXAMPLES 9 AND 10

Use of dispersions

EXAMPLE 9

Polymer composition 63 parts of butyl acrylate, 30 parts of methacrylic acid, 7 parts of acrylonitrile A mixture of 660 g of water, 0.8 g of a neutralized $C_{12}$–$C_{14}$-alkylsulfonate and 80 g of the monomer emulsion was heated to 85° C. and admixed with 15% of a solution of 9.6 g of sodium persulfate in 375 g of water on attainment of an internal temperature of 60° C. After 15 min a start was made, while maintaining the polymerization temperature, with continuously adding the remainder of the monomer emulsion over 120 min and the remainder of the initiator solution over 135 min. On completion of the addition this temperature was maintained for a further 60 min. After cooling down to room temperature 0.2% is added in each case, based on the monomer mass, of an aqueous solution of t-butyl hydroperoxide and ascorbic acid. The product obtained was a coagulum- and gel-free dispersion having a solids content of 40%, a pH of 2.9 and a light transmissivity (0.01% strength) of 80%.

Composition of monomer emulsion:

756 g of n-butyl acrylate
360 g of methacrylic acid
84 g of acrylonitrile
4.7 g of neutralized $C_{12}$–$C_{14}$-alkylsulfonate
5 g of sodium vinylsulfonate 25% strength
750 g of water.

EXAMPLE 10

Example 9 is repeated except that a 45% strength polymer dispersion having a composition of 73 parts of butyl acrylate, 20 parts of methacrylic acid and 7 parts of acrylonitrile was prepared. The pH was 2.3, the light transmissivity (0.01% strength) 77%.

20 parts of HOM 154 were added per 100 parts of dispersion and stirred in over 30 min. Drying conditions: 6 min at 230° C.

| Sample | Proportions of HOM 154 | BS, dry at 25° C. | BS, wet at 25° C. | BS, wet at 80° C. | BS at 180° C. | BOL in % |
|---|---|---|---|---|---|---|
| Ex. 9 | 0 | 215 | 157 | 75 | 52 | 0.7 |
| Ex. 9 | 20 | 229 | 211 | 185 | 76 | 0.9 |
| Ex. 10 | 0 | 187 | 109 | 71 | 47 | 0.8 |
| Ex. 10 | 20 | 223 | 159 | 110 | 77 | 0.7 |

We claim:

1. A formaldehyde-free binding, impregnating or coating composition comprising:

A) a polymer which comprises 2–100% by weight of a comonomer selected from the group consisting of ethylenically unsaturated acid and ethylenically unsaturated anhydride, and B) at least one polyol selected from the group consisting of a triazine of the formula

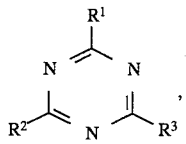

I where $R^1$ to $R^3$ are each independently of the others a radical $X[(C_mH_{2m}O)_nH]$ or $N[(C_mH_{2m}O)_nH]_2$ where X is NH, O or S, m is from 2 to 5 and n is from 1 to 10, a triazinetrione of the formula

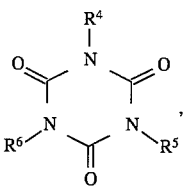

II where $R^4$ to $R^6$ are each independently of the others a radical $[(C_mH_{2m}O)_nH]$ where m is from 2 to 5 and n is from 1 to 10, a benzene or cyclohexyl derivative of the formula

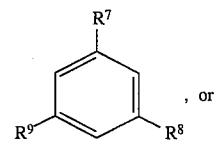

III

, or

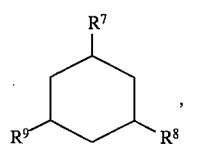

IV where $R^7$ to $R^9$ are each independently of the others a radical $[X(C_mH_{2m}O)_nH]$, a radical $N[C_mH_{2m}O)_nH]_2$, a radical $[Y(C_mH_{2m}O)_nH]$ or a radical $[(C_mH_{2m}O)_nH]$ where X is NH, O or S, Y is bivalent $C_1$–$C_6$-alkyl or acyl, m is from 2 to 5 and n is from 1 to 10 and a mixture thereof.

2. A formaldehyde-free binding, impregnating or coating composition as claimed in claim 1 wherein the proportions of A) and B) are selected so that the molar ratio of the acid and/or anhydride groups in A) to compounds B) is within the range from 1000:1 to 1:1.

3. A bonded fibrous sheet material comprising a sheet of fibrous material bound with the formaldehyde-free binding, impregnating or coating composition as claimed in claim 1.

4. A process for producing a bonded fibrous sheet material, which comprises steps whereby a formaldehyde-free binding, impregnating or coating composition as claimed in claim 1 is applied to a fibrous sheet material and then cured at elevated temperature.

5. The bonded fibrous sheet material of claim 3 wherein said sheet of fibrous material comprises a fiber selected from the group consisting of glass fibers, mineral fibers, polyester fibers and a mixture thereof.

6. An inliner in bituminized roofing felt comprising the bonded fibrous sheet material of claim 3.

7. A floor covering comprising the bonded fibrous sheet material of claim 3.

8. A filter material comprising the bonded fibrous sheet material of claim 3.

9. A battery separator comprising the bonded fibrous sheet material of claim 3.

* * * * *